United States Patent
Schmitz

(10) Patent No.: US 7,316,422 B1
(45) Date of Patent: Jan. 8, 2008

(54) SAFETY ELEMENT AND A VALUABLE OBJECT

(75) Inventor: Christian Schmitz, Schliersee-Neuhaus (DE)

(73) Assignee: Giesecke & Devrient GmbH, Munich (DE)

( * ) Notice: Subject to any disclaimer, the term of this patent is extended or adjusted under 35 U.S.C. 154(b) by 963 days.

(21) Appl. No.: 10/069,116

(22) PCT Filed: Aug. 29, 2000

(86) PCT No.: PCT/EP00/08415

§ 371 (c)(1),
(2), (4) Date: Jul. 1, 2002

(87) PCT Pub. No.: WO01/16426

PCT Pub. Date: Mar. 8, 2001

(30) Foreign Application Priority Data

Aug. 31, 1999 (DE) .............................. 199 41 295

(51) Int. Cl.
*B23D 15/00* (2006.01)

(52) U.S. Cl. ........................ 283/91; 283/72; 428/916

(58) Field of Classification Search ................. 283/72, 283/81, 91, 92, 82; 428/40.1, 42.1, 195.1, 428/915, 916

See application file for complete search history.

(56) References Cited

U.S. PATENT DOCUMENTS

| | | | | |
|---|---|---|---|---|
| 5,310,222 A | * | 5/1994 | Chatwin et al. | 283/86 |
| 5,883,043 A | * | 3/1999 | Halbrook et al. | 503/204 |
| 6,491,324 B1 | * | 12/2002 | Schmitz et al. | 283/82 |
| 6,616,190 B1 | * | 9/2003 | Jotcham | 503/200 |
| 6,688,221 B1 | * | 2/2004 | Kaule | 101/129 |

FOREIGN PATENT DOCUMENTS

| | | | |
|---|---|---|---|
| WO | WO 99/04983 | * | 2/1999 |
| WO | WO 01/16426 | * | 3/2001 |

* cited by examiner

*Primary Examiner*—Dana Ross
(74) *Attorney, Agent, or Firm*—Bacon & Thomas, PLLC

(57) ABSTRACT

This invention relates to an object of value with a security element having a thermochromic layer and disposed completely on the surface of the object of value. The thermochromic layer is combined with an effect layer having visually and/or machine testable properties.

18 Claims, 4 Drawing Sheets

SAFETY ELEMENT AND A VALUABLE OBJECT

BACKGROUND

This invention relates to a security element for protecting objects of value, the security element having a thermochromic layer. The invention relates further to an object of value, a security document and a security paper with such a security element and to a foil material for producing such a security element.

It has been known for some time to use thermochromic materials for protecting documents of value. For example, DT 22 12 350 describes a security thread made of transparent plastic which has cavities. Said cavities contain a liquid-crystalline material which shows a reversible color change upon an increase or decrease of temperature.

EP 0 608 078 B1 likewise discloses a security thread with thermochromic properties. In this case a plastic material is provided with a print or with characters which are formed by partly demetalizing a metal layer. Said print or negative characters bear a thermochromic coating which is colored at normal temperature. When heated the thermochromic coating becomes colorless so that the characters therebelow become recognizable. Alternatively, a thermochromic coating can be used which is colorless at normal temperature and becomes colored when heated so that the characters disappear. Said thread is incorporated into the security paper so as to pass directly to the surface in certain areas, so-called "windows."

Such thermochromic security threads have the disadvantage, however, that they are very narrow and the thermochromic effect is recognizable only in the relatively small window areas, so that the optical effect evoked by the color change of the thermochromic material is very inconspicuous. Such security elements therefore do not offer very high protection from forgery.

SUMMARY

The invention is therefore based on the problem of providing a security element that offers high protection from forgery and avoids the disadvantages of the prior art.

This problem is solved by the features of the independent claims. Developments are the subject matter of the subclaims.

According to the invention, the security element is disposed completely on the surface of the object and combined with an effect layer having visually and/or machine testable properties. Since the security element is disposed completely on the surface of the object it can be executed over a substantially greater surface so that the color change of the thermochromic material is substantially more conspicuous due to the greater surface. The combination with an effect layer having further visually and/or machine testable properties additionally gives the security element greater protection from forgery, since such effect layers either are elaborate to produce or cannot readily be procured on the market.

Said effect layers can be for example special luminescent or magnetic substances which are added to a printing ink for example.

The printing ink can of course contain further coloring pigments. It is preferably applied in the form of a pattern or alphanumeric characters.

Alternatively, the effect layer can also be a directly reflecting layer, such as a translucent layer, which produces different color effects in reflected light upon a change of viewing angle. Such optically variable properties are found for example in interference layer pigments or liquid crystal pigments that can be added to a transparent binder or a transparent plastic layer. However, the optically variable effect can also be produced with transparent diffraction grating structures. In this case a translucent or transparent layer, preferably a lacquer layer, is provided with a relief structure in the form of a diffraction structure. The relief structure is then combined with a transparent dielectric layer to permit the optically variable effect of the diffraction structure to be observed in reflected light. Simultaneously, information disposed under the diffraction structure can be recognized due to the transparency of the layers.

The directly reflecting layer can alternatively be formed as a metal layer, preferably aluminum layer. The metal layer is executed either all over or at least in certain areas in the form of a screen. Additionally, the metal layer can have gaps in the form of characters or patterns in which a metal layer can likewise be disposed in the form of a screen. This second metal layer preferably likewise consists of an aluminum layer. That is, the directly reflecting layer can, according to a special embodiment, consist of a metallic screen with a predetermined screen dot size and screen width with areas incorporated therein which vary with respect to screen width and/or screen dot size. In this way readable characters or patterns can be provided in the reflecting layer. The screen elements need not necessarily be dots, however. They can also consist of lines or other geometrical shapes.

According to a further embodiment, thermochromic characters or patterns can be disposed in the gaps of the reflecting layer. The color change temperature of this thermochromic layer is preferably different from that of the first thermochromic layer.

Moreover, the metal layer can be combined with a further layer with a relief structure in the form of diffraction structures incorporated therein.

The inventive thermochromic layer can also be varied in numerous ways within the scope of the invention. Thus, the thermochromic layer can be provided all over or only in certain areas, preferably in the form of characters or patterns. A further possibility is to combine the thermochromic layer with at least one further thermochromic or visually recognizable layer, the two layers supplementing each other to form recognizable information.

Depending on the effect layer, the thermochromic layer can be disposed over or under the effect layer. If the thermochromic layer is disposed under a transparent effect layer, further information in the form of characters and/or patterns can be disposed below the thermochromic layer. Said information can in turn be alternatively printed or produced by a laser. The information is preferably black. Other color designs are not excluded, however. Additionally, the information can have visually and/or machine testable properties such as luminescence or magnetism.

The thermochromic substances used for the thermochromic layer are preferably opaque below a predetermined temperature and at least translucent above said temperature. In certain applications it may be expedient to use thermochromic substances that are translucent or transparent below a predetermined temperature and opaque above said temperature. The color change temperature of the thermochromic substances is preferably above ambient temperature, e.g. in the range of 25° C. to 60° C., preferably 30° C. to 60° C.

The individual layers of the security element can be either produced directly on the object of value or prepared on a separate carrier. In the latter embodiment the security element can be formed for example as a self-supporting label. Alternatively, it is also possible to produce a transfer material whereby the layer structure of the later security element is prepared in endless form on a carrier material. The layer structure is then transferred to the object of value from said carrier material in the desired outline form with the aid of an adhesive. A hot-melt adhesive is preferably used for this purpose. In order to fix the outline form of the security element, an adhesive layer can either be provided only in the areas to be transferred, or the adhesive, such as a hot-melt adhesive, is activated only in the areas to be transferred.

The object of value to which the security element is applied can be for example a security paper, a security document or a product package. Other objects of value requiring security-type protection can of course also be provided with the inventive security element.

BRIEF DESCRIPTION OF THE DRAWINGS

Further advantages and embodiments of the invention will be explained in more detail with reference to the figures, in which.

DESCRIPTION OF VARIOUS EMBODIMENTS

The invention will for clarity's sake be explained in more detail by the example of a bank note.

Figure 1:
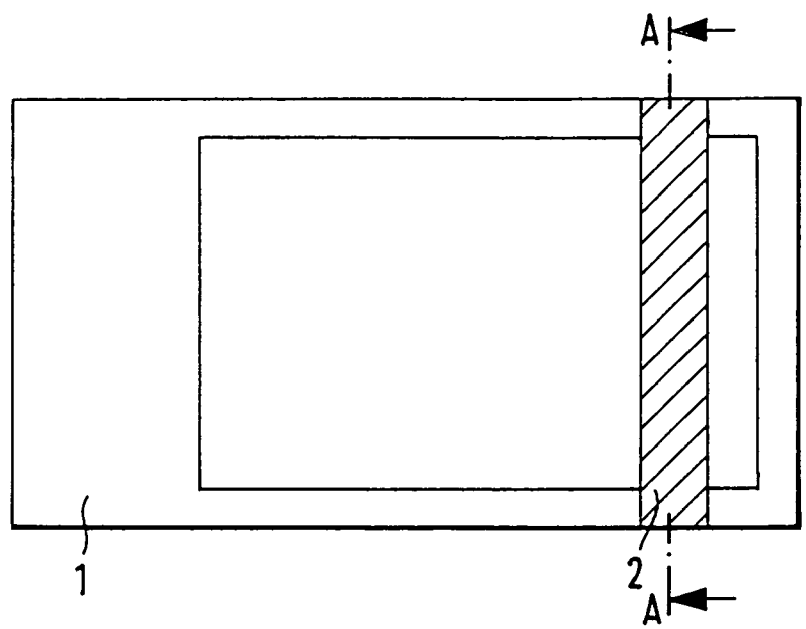
FIG. 1 shows a security document with an inventive security element.

FIG. 1 shows such a bank note 1 made of paper or plastic and provided with security element 2 in the form of a strip extending over the total width of the bank note. Bank note 1 can of course have further security features such as watermarks, steel intaglio, security thread or luminescent or magnetic prints or the like.

Security element 2 has a thermochromic layer which is combined with an effect layer which in turn has visually and/or machine testable properties. Security element 2 is disposed completely on the surface of bank note 1 so that the color change of the thermochromic layer preferably applied all over is very well recognizable.

Besides the thermochromic layer and the effect layer, security element 2 can also have further layers that produce further striking optical effects alone or in combination with other layers of the security element. Some preferred embodiments will be explained in more detail with reference to FIGS. 2 to 10 which show bank note 1 in cross section along dash-dotted line A-A to illustrate the layer structure of security element 2.

Figure 2:
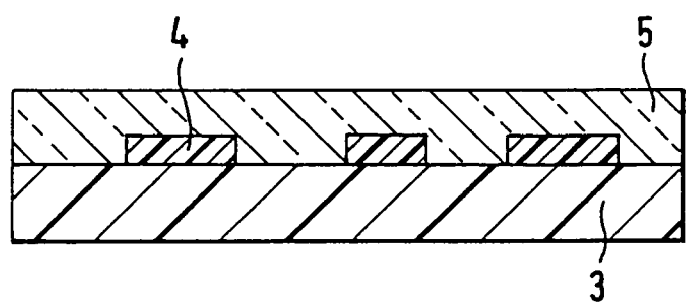
FIGS. 2 to 11 show different embodiments of the security document in cross section.

According to FIG. 2, paper or plastic substrate 3 of bank note 1, said substrate having a white or light inherent color, is provided with thermochromic print 4 in the form of characters or patterns. Over thermochromic layer 4 there is directly reflecting translucent layer 5 that produces different color effects in reflected light upon a change of viewing angle. This effect is called an "optically variable" effect. Layer 5 can be for example a printing ink consisting of a transparent binder with interference layer pigments or liquid crystal pigments mixed thereinto.

Since said pigments are transparent and have little or no inherent body color, the visually recognizable optical impression of said pigments is determined very largely by the background. On a diffusely reflecting white or light background the pigments hardly appear, since the diffusely reflected scattered light overlays the optically variable effect based on interference effects. On a dark background, however, the interplay of colors of said pigments stands out especially well, since the background absorbs the transmitted radiation.

For this reason the thermochromic material used for layer 4 is preferably opaque at normal ambient temperature and has a dark, preferably black, inherent color. In this case the optically variable effect produced by effect layer 5 stands out especially in the area of thermochromic layer 4, so that the characters represented by thermochromic layer 4 become visible. Above the color change temperature of thermochromic layer 4 the latter preferably becomes colorless or changes to another, substantially lighter color so that the characters are no longer recognizable.

The reverse effect occurs if a thermochromic material is used which is light or transparent at normal ambient temperature and opaque, preferably black, only above a certain activation temperature.

Figure 3:
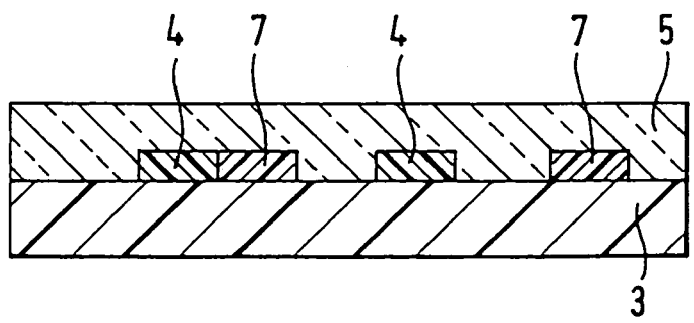

In FIG. 3, substrate 3 is provided with thermochromic print 4 and further print 7. Disposed thereabove is optically variable, transparent layer 5, as in FIG. 2. Print 4 and print 7 supplement each other to form total information, which can consist of a text, picture, pattern or the like. Print 7 has no thermochromic properties but can show the same visual color effect as thermochromic layer 4.

The thermochromic material used for print 4 is preferably opaque at normal ambient temperature and has a dark inherent color. Print 7 is likewise selected to be dark so that optically variable layer 5 can only be clearly perceived in the area of prints 4, 7 and thus the information represented by prints 4, 7 is recognizable. When the security element is heated to a temperature above the color change temperature of the thermochromic material, the information portion represented by print 4 disappears since thermochromic layer 4 becomes colorless or changes to another, substantially lighter color.

The reverse case also occurs here if a thermochromic material is used which is colorless at room temperature or has a light body color and becomes opaque or dark only above the color change temperature.

Figure 4:
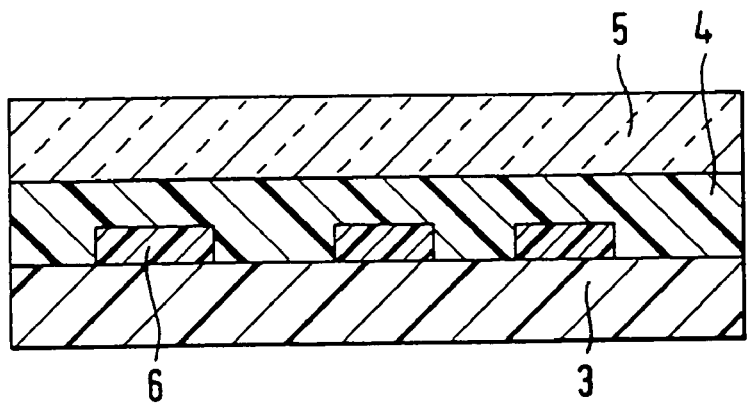

FIG. 4 shows a layer structure wherein substrate 3 is provided with dark, preferably black, print 6 in a first step. Applied over print 6 is all-over layer 4 of thermochromic material, followed by optically variable translucent layer 5. If the material used for thermochromic layer 4 is again dark and opaque at ambient temperature, optically variable layer 5 appears as a brilliant layer with an interplay of colors. Above the color change temperature of the thermochromic material, layer 4 becomes transparent and optically variable layer 5 can only be recognized well in the area of marking 6 therebelow. In this way it is possible to produce information that is only visible above the color change temperature of the thermochromic material.

The reverse effect of course also occurs here if a thermochromic material is used which becomes opaque only above the color change temperature. In this case only marking 6 is recognizable as optically variable information at ambient temperature. Above the activation temperature of the thermochromic material, said marking disappears since the thermochromic layer becomes opaque and thus total layer 5 is recognized as an optically variable layer.

Figure 5:
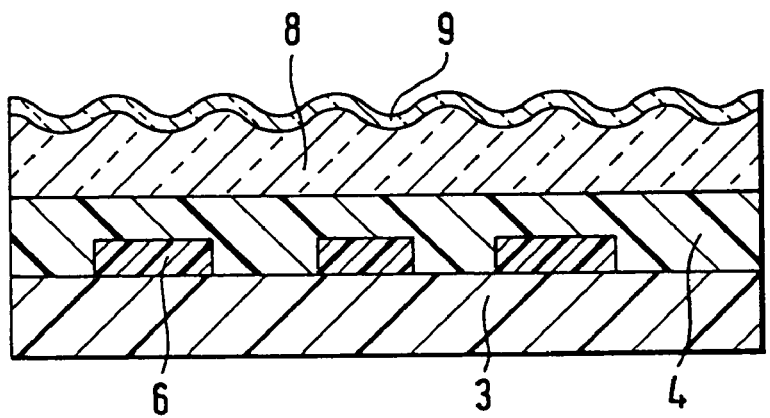

In the embodiment shown in FIG. 5, the effect layer designated 5 in FIG. 4 is replaced with a combination of layers 8 and 9. Layer 8 is a transparent lacquer or plastic layer with a relief structure in the form of diffraction structures embossed into the surface thereof. Said relief structure is combined with thin, dielectric, likewise transparent reflection layer 9 whose refractive index is coordinated with the refractive index of layer 8 such that the diffraction structure can be viewed in reflected light, on the one hand, while transparency of the diffraction structures is simultaneously guaranteed. Like the interference layer or liquid crystal pigments explained above in connection with FIG. 2, the diffraction structure cannot be recognized properly or at all on a light background due to its transparency, while it is clearly visible against a dark background. In the embodiment shown in FIG. 5, the same optical effects therefore occur as explained above in connection with FIG. 4.

In the embodiments described with reference to FIGS. 2 and 3, layer 5 can also be replaced with a combination of embossed layer 8 and dielectric reflection layer 9.

Figure 6:
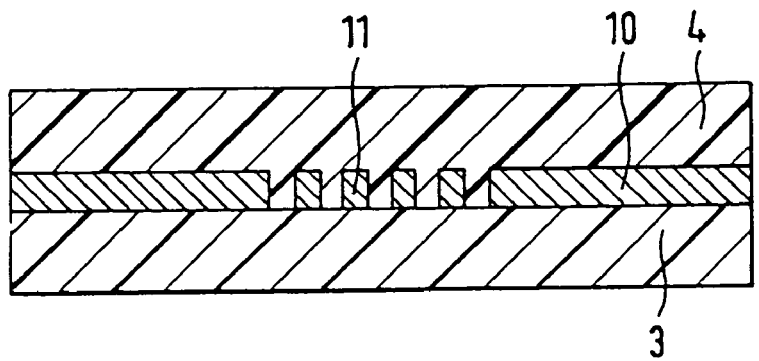

FIG. 6 shows a further embodiment of the inventive document of value. Here, substrate 3 is provided with metal layer or layer with metallic luster 10 which is executed at least in certain areas in the form of screen 11. Screened areas 11 can have the form of characters, patterns, pictures or the like. Above layer 10 there is thermochromic layer 4 disposed all over. Depending on the thermochromic material used, layer 10 is visible at room temperature or above the color change temperature of thermochromic layer 4.

Figure 7:
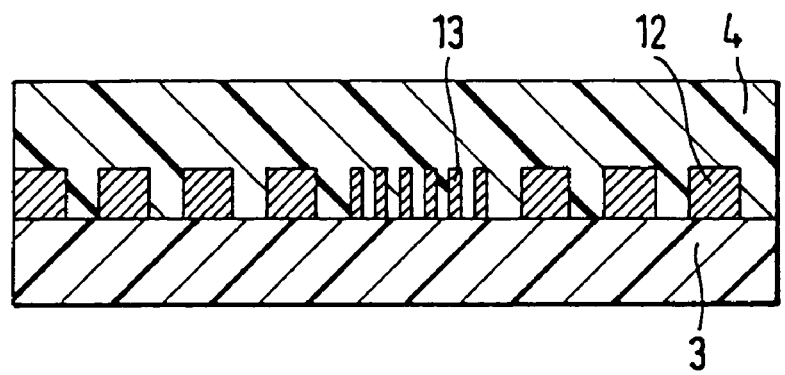

FIG. 7 shows a similar embodiment. In this case the metal layer or layer with metallic luster is executed as a screen in the total area. It consists of background screen 12 with a certain screen dot size or screen width and at least one partial area 13 in which the screen has a smaller screen width and smaller screen dot size. This screen variation permits visually readable information to be represented which is visible at certain temperatures depending on thermochromic material 4 used.

Figure 8:
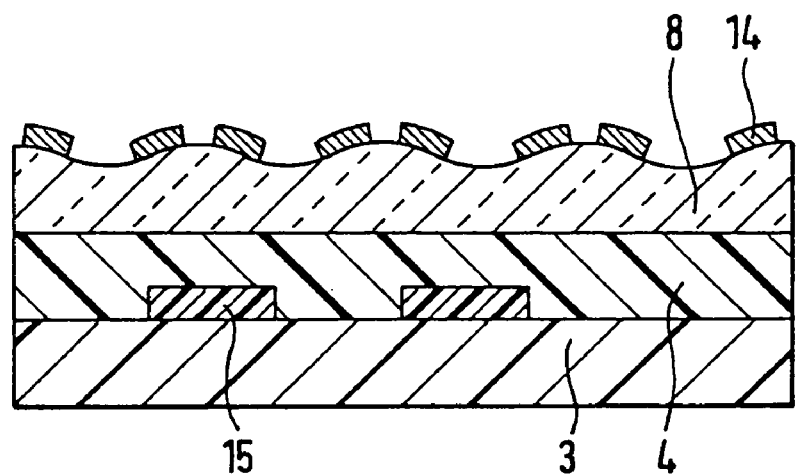

Screened layers 10, 11, 12, 13 shown in FIGS. 6 and 7 can additionally be combined with an embossed layer. Such an embodiment is shown in FIG. 8. In this case, uniformly screened metal layer 14 forms the reflection layer for a diffraction structure therebelow that is embossed into transparent lacquer layer 8. Through the gaps in screened layer 14, information therebelow can be recognized. Under embossed layer 8 thermochromic layer 4 and print 15 are disposed all over, print 15 directly adjoining substrate 3. If thermochromic layer 4 used is opaque at room temperature, the diffraction structure is recognizable in reflected light under normal conditions. Simultaneously, the color effect of thermochromic layer 4 is perceptible due to the transparent and thus translucent diffraction structure. When the security element is heated to a temperature above the color change temperature of thermochromic layer 4, the latter likewise becomes transparent and information 15 can be recognized and read through screened layer 14.

If thermochromic material 4 used is translucent at room temperature, the reverse effect occurs and information 15 becomes invisible above the color change temperature of thermochromic layer 4.

The screen dot sizes or screen dot densities can be selected in accordance with the particular requirements in the examples shown. The screen elements used need not necessarily be dots. Other geometrical shapes such as lines, squares, triangles or the like are likewise possible.

Figure 9:
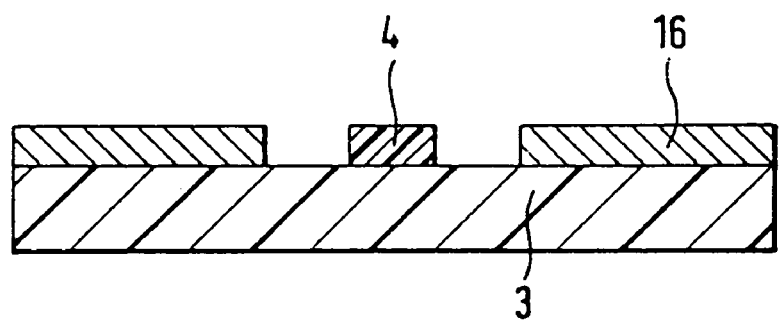

FIG. 9 shows an embodiment wherein substrate 3 is provided with effect layer 16, preferably a metal layer, which has gaps in the form of characters, patterns, pictures or the like. In the area of said gaps there is thermochromic layer 4 likewise in the form of information. Said information can be identical in content to the information represented by the gaps and extend congruently thereto.

According to a preferred embodiment, the material used for thermochromic layer 4 is translucent or transparent at room temperature. The information represented by layer 4 becomes readable only above the color change temperature of the thermochromic material. For example, the term "Valid" can appear in the area of the gaps when heated.

In a further variant, layer 16 can have disposed thereon all over a further thermochromic layer which is for example opaque at room temperature and becomes colorless or translucent above the color change temperature. The color change temperature of said layer is preferably somewhat below the color change temperature of layer 4, so that when heated above the first color change temperature the all-over thermochromic layer becomes transparent or translucent and gives a view of layers 16, 4 therebelow. When heated further, the information represented by layer 4 appears, or disappears, or changes its color, depending on which thermochromic material is used for layer 4.

Alternatively or additionally, a further print that can at least partly have thermochromic properties can be present under layer 16.

Figure 10:
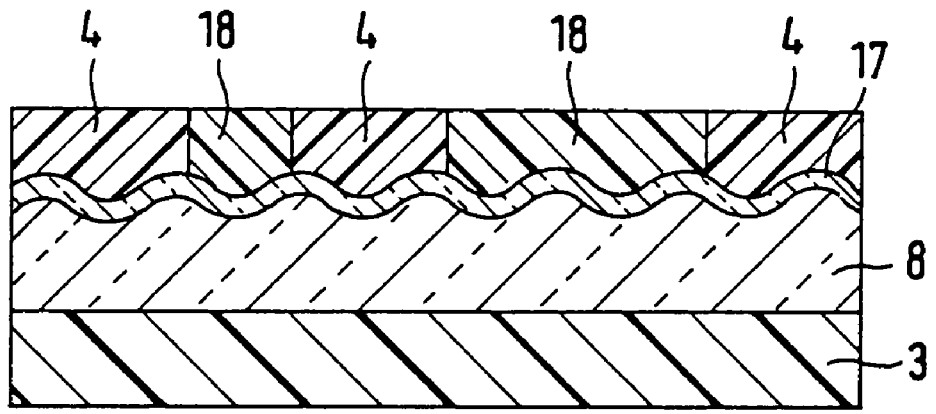

FIG. 10 shows an embodiment wherein substrate 3 is first provided with embossed layer 8 and reflection layer 17 which ensures that the diffraction structures incorporated into embossed layer 8 can be observed in reflected light. Above reflection layer 17 at least one thermochromic layer 4 in the form of information is applied. The spaces in said information are filled with color layer 18 which shows the same color effect as thermochromic layer 4, so that the impression of an all-over uniform coating arises at room temperature. Only when heated above the color change temperature of thermochromic layer 4 does the latter become at least translucent and give a view of the diffraction structure therebelow. Since the diffractive areas have the outline form of the information represented by thermochromic layer 4, said information likewise becomes recognizable.

Figure 11:
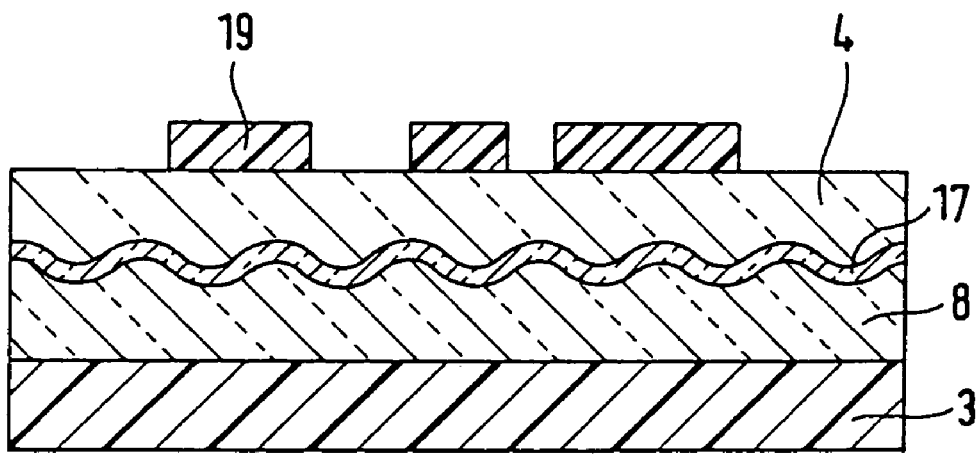

According to FIG. 11, substrate 3 likewise has adjacent thereto embossed layer 8 which is combined with reflection layer 17. Above reflection layer 17 there is thermochromic layer 4 disposed all over. Further print 19 is finally located on thermochromic layer 4. The thermochromic material used here is also preferably opaque at room temperature. Only when heated above the color change temperature of the thermochromic material does the diffraction structure therebelow become visible. Layer 4 and print 19 can also have the same or different colors.

This embodiment is also suitable for protecting a signature stripe for example. The signature stripe consists in this case of embossed layer 8, reflection layer 17 and all-over thermochromic coating 4. Print 19 is replaced in this case with the user's signature. For authenticity testing of the signature stripe, the thermochromic layer is activated so that it becomes transparent or translucent and the diffraction structures become visible under the signature.

The diffraction structures mentioned in the various examples can be holograms or any grating structures, such as pixelgrams, Kinegrams® or the like.

It is likewise possible that thermochromic layer 4 and/or at least one of color layers 6, 7, 15, 18, 19 shown have further visually and/or machine testable properties such as electric conductivity, magnetism, luminescence or the like. To give the particular print electrically conductive properties, it suffices for example to add a sufficient amount of carbon black pigments to the printing inks used. Since the nonthermochromic prints are likewise to have a dark, preferably black, inherent color in many examples, they can be equipped with magnetic properties in a very simple way by using dark magnetic pigments instead of coloring pigments.

The thermochromic layer can also have a plurality of thermochromic materials with different color change temperatures. It is likewise possible to compose the thermochromic layer of a plurality of color layers which contain different thermochromic materials with different color change temperatures.

Since it may be difficult to provide the object of value with the particular layer sequence directly in some cases, it may be useful to prepare the layer structure of the security element at least partly on a transfer material. This procedure is expedient in particular when using diffraction structures which are combined with a reflection layer, since the reflection layer is normally vapor-deposited and the production of metallic screen structures also requires special production steps such as etching or washing, depending on which specific demetalizing method is applied. It is therefore expedient to form at least the diffraction structures and the associated reflection layer as a hot stamping foil and then combine said foil in register with the other layers of the security element on the object of value.

If the total layer sequence of the security element is prepared on a transfer material, it is to be heeded that the layer structure shown in the various figures must be prepared on the carrier band of the transfer material in the reverse order. The layer structure of the security element can be prepared on the carrier band in endless form or else already in the final outline form used as the security element. The security element is transferred to an object of value to be protected with the aid of an adhesive layer which is applied either to the object of value or to the uppermost layer of the transfer material. After transfer, the carrier band of the transfer material is removed and only the shown layer structure of the security element remains on the object of value to be protected.

The invention claimed is:

1. A security element for protecting objects of value, the security element comprising a thermochromic layer combined with a translucent layer, and the thermochromic layer being disposed under the translucent layer, the translucent layer producing different color effects in reflected light upon a change of viewing angle and containing liquid crystal pigments or a relief structure in the form of a diffraction structure combined with a transparent dielectric layer or with a metal layer present at least in certain areas in the form of a screen.

2. The security element according to claim 1, wherein the thermochromic layer is opaque below a predetermined temperature and at least translucent above said temperature.

3. The security element according to claim 1, wherein the screen is present in the form of a dot or line screen.

4. An object of value comprising a security element having a thermochromic layer combined with a translucent effect layer, the thermochromic layer being disposed under the effect layer, the security element disposed completely on the surface of the object of value, and the translucent layer producing different color effects in reflected light upon a change of viewing angle and containing liquid crystal pigments or a relief structure in the form of a diffraction structure combined with a transparent dielectric layer or with a metal layer present at least in certain areas in the form of a screen.

5. The object of value according to claim 4, wherein the screen is present in the form of a dot or line screen.

6. The object of value according to claim 4, wherein the thermochromic layer is all over.

7. The object of value according to claim 4, wherein the thermochromic layer is provided only in certain areas.

8. The object of value according to claim 7, wherein the thermochromic layer is provided in the form of characters and/or patterns.

9. The object of value according to claim 7, wherein the thermochromic layer is combined with at least one further thermochromic or visually recognizable layer, the layers supplementing each other to form recognizable information.

10. The object of value according to claim 4, wherein information in the form of characters and/or patters id disposed under the thermochromic layer.

11. The object of value according to claim 10, wherein the information is printed or produced by means of a laser.

12. The object of value according to claim 10, therein the information has visually and/or machine testable properties.

13. The object of value according to claim 12, wherein the information has luminescent or magnetic properties.

14. The object of value according to claim 10, wherein the information is black.

15. The object of value according to claim 4, wherein the thermochromic layer is opaque below a predetermined temperature and at least translucent above said temperature.

16. The object of value according to claim 4, wherein the thermochromic layer is translucent or transparent below a predetermined temperature and opaque above said temperature.

17. The object of value according to claim 4, wherein the security element is a label.

18. The object of value according to claim 4, wherein the object of value is selected from the group consisting of a security paper, security document and product package.

* * * * *